(12) United States Patent
Fuchiwaki (10) Patent No.: US 7,522,502 B2
(45) Date of Patent: Apr. 21, 2009

(54) DATA READ/WRITE DEVICE AND DATA READ/WRITE METHOD

(75) Inventor: Atsushi Fuchiwaki, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 585 days.

(21) Appl. No.: 11/367,384

(22) Filed: Mar. 6, 2006

(65) Prior Publication Data

US 2007/0050680 A1   Mar. 1, 2007

(30) Foreign Application Priority Data

Aug. 31, 2005   (JP) .............................. 2005-250718

(51) Int. Cl.
  *G11B 7/00* (2006.01)
  *G11B 27/36* (2006.01)
(52) U.S. Cl. ............... 369/53.17; 369/47.14; 369/47.53
(58) Field of Classification Search ............. 369/53.16, 369/53.17, 53.31, 53.35, 53.36, 47.14, 275.3, 369/30.07, 47.53; 714/42, 54, 710
See application file for complete search history.

(56) References Cited

U.S. PATENT DOCUMENTS

| | | | | |
|---|---|---|---|---|
| 5,404,357 A * | 4/1995 | Ito et al. | ................... | 369/44.27 |
| 6,529,458 B1 * | 3/2003 | Shin | ......................... | 369/53.17 |
| 6,615,363 B1 * | 9/2003 | Fukasawa | ...................... | 714/5 |
| 6,804,797 B2 * | 10/2004 | Ko et al. | ................... | 369/53.15 |
| 6,892,327 B2 * | 5/2005 | Ko et al. | ................... | 369/53.15 |
| 6,963,523 B1 * | 11/2005 | Park | ......................... | 369/47.14 |
| 7,233,550 B2 * | 6/2007 | Park et al. | ................. | 369/47.14 |
| 7,289,404 B2 * | 10/2007 | Park et al. | ................. | 369/53.17 |
| 7,313,062 B2 * | 12/2007 | Kobayashi | ................. | 369/47.1 |
| 7,355,934 B2 * | 4/2008 | Park et al. | ................. | 369/47.14 |
| 7,385,889 B2 * | 6/2008 | Lee et al. | .................. | 369/47.14 |

FOREIGN PATENT DOCUMENTS

| | | |
|---|---|---|
| JP | 2002-245723 | 8/2002 |
| JP | 2004-014088 | 1/2004 |

* cited by examiner

*Primary Examiner*—Thang V Tran
(74) *Attorney, Agent, or Firm*—Antonelli, Terry, Stout & Kraus, LLP.

(57) ABSTRACT

A data read/write device writes to or reads from an optical disc medium having thereon a plurality of areas in which management information is redundantly stored. Conditions for setting a read/write operation are indicated in third management information stored in the inner circumferential area. The pickup of the device performs the steps of: reading a first management information group from the inner circumferential area; retrieving a piece of third management information based on the corresponding valid address included in the first management information group; moving to the outer circumferential area and reading a second management information group; and if the update count of the second management information group is higher than that of the first management information group, retrieving a piece of third management information based on the corresponding valid address included in the second management information group.

8 Claims, 9 Drawing Sheets

FIG.1

FIG.3A  DDS (DISC DEFINITION STRUCTURE)

| BYTE POSITION | MANAGEMENT INFORMATION | BYTE LENGTH |
|---|---|---|
| 0 | DDS IDENTIFICATION = "DS" | 2 |
| 2 | DDS TYPE NUMBER | 1 |
| 3 | RESERVED (00h) | 1 |
| 4 | DDS UPDATE COUNT | 4 |
| 8 | VALID DSI ADDRESS OF DISC STATE INFORMATION 1 | 4 |
| 12 | VALID DSI ADDRESS OF DISC STATE INFORMATION 2 | 4 |
| 16 | RESERVED (00h) | 4 |
| 20 | RESERVED (00h) | 4 |
| 24 | START PHYSICAL ADDRESS OF DEFECT LISTS (AD_DFL) WITHIN DMA | 4 |
| 28 | RESERVED (00h) | 4 |
| 32 | START PHYSICAL SECTOR ADDRESS OF USER AREA | 4 |
| 36 | END LOGICAL SECTOR ADDRESS OF USER AREA | 4 |
| 40 | SIZE OF INNER SPARE AREA (ISA) | 4 |
| 44 | SIZE OF OUTER SPARE AREA (OSR) | 4 |
| 48 | RESERVED (00h) | 4 |
| 52 | SPARE AREA AVAILABILITY FLAG | 1 |
| 53 | RESERVED (00h) | 65438 |

FIG.3B  DFL (DEFECT LIST)

| BYTE POSITION | MANAGEMENT INFORMATION | BYTE LENGTH |
|---|---|---|
| 0 | DEFECT LIST MANAGEMENT INFORMATION (DFL UPDATE COUNT, ETC.) | 64 |
| 64 | SPARE ADDRESS INFORMATION #1 | 8 |
| 72 | SPARE ADDRESS INFORMATION #2 | 8 |
| | ....... | |
| | SPARE ADDRESS INFORMATION #N | 8 |
| 64+8×n | END OF SPARE ADDRESS INFORMATION | 8 |
| | RESERVED (00h) | |
| | ....... | |
| | RESERVED (00h) | |

4 CLUSTERS

DATA READ/WRITE DEVICE AND DATA READ/WRITE METHOD

CLAIM OF PRIORITY

The present application claims priority from Japanese application Serial No. JP 2005-250718, filed on Aug. 31, 2005, the content of which is hereby incorporated by reference into this application.

BACKGROUND OF THE INVENTION

1. Field of the Invention

The present invention relates to a data read/write device and method using a recording medium such as a high-density optical disc.

2. Description of the Related Art

There has been a need to manage optical disc media in a highly reliable manner in order to increase their recording density. In this connection, defect management information, stored on each loaded disc to indicate the defect locations and the corresponding spare areas on the disc, is essential to data read/write operation. Further, in order to allow a setup operation to be efficiently performed on the device, the disc stores information about the various conditions under which data was previously written to or read from it (e.g., the magnitude of the write power) and this information is later read at the beginning of each subsequent read or write operation. The defect management information is redundantly stored in a plurality of disc management areas (hereinafter referred to as DMAs) on the disc.

For example, a DVD-RAM disc has four disc management areas (DMA 1 to DMA 4) thereon; two of them are provided on the inner circumferential side of the optical disc and the other two are provided on the outer circumferential side (see, e.g., Japanese Patent Laid-Open No. 2002-245723).

Further, in the case of a DVR (Data & Video Recording) disc (a high-capacity high-density disc), the two disc management areas (DMA 1 and DMA 2) on the inner circumferential side are radially spaced apart from each other by a test write area (OPC). This arrangement prevents both disc management areas (DMA 1 and DMA 2) from being damaged at once due to a defect, flaw, etc., thereby increasing the reliability of these DMAs. The disc definition structure (DDS) stored in each disc management area holds the update count, and if the count has reached its maximum value of overwrite count, another disc management area is used to store defect management information, thereby increasing the reliability of the read/write operation on the DMAs. Further, with this arrangement, the update counts held in the DDSs are compared with one another to determine which one or ones of the DMAs store valid data (see, e.g., Japanese Patent Laid-Open No. 2004-14088).

SUMMARY OF THE INVENTION

Further, a high-density optical disc may have an area for managing disc state information such as the write power in order to allow the disc to be comprehensively managed. (The disc state information and the area for managing it are hereinafter referred to as "DSI" and a "disc state information area", respectively.) Further, in this case, the disc state information area may be divided into a plurality of areas arranged in the inner circumferential area (or the lead-in zone) of the disc, or in both the inner circumferential area and the outer circumferential area (or the lead-out zone) of the disc, to increase reliability. Each DDS described above may hold valid DSI addresses to manage DSI and to indicate which one or ones of the areas store valid data (or DSI).

When a high-density disc has a plurality of disc management areas (DMA 1 to DMA 4) and a plurality of disc state information areas thereon (as described above), each piece of information stored in these areas is sequentially read and compared with one another to determine which area or areas store valid information (or the latest information). Then, a setup operation for a read or write operation is performed on the device based on the information determined to be valid. However, this configuration of a high-density disc leads to an increase in the management information. Furthermore, since the above areas storing the management information are arranged on both the inner circumferential side (or within the lead-in zone) and the outer circumferential side (or within the lead-out zone) of the disc in a discrete manner, the read pickup must move between these areas and in some cases, it must go from one side to the other side and return. However, there is a limit to the traveling speed of the pickup, increasing the time required to read the information and complete the setup operation.

It is, therefore, an object of the present invention to provide a data read/write device and method adapted to efficiently and reliably retrieve valid disc management information and thereby reduce the device setup time.

The present invention provides a data read/write device for writing data to and reading data from an optical disc medium having thereon a plurality of areas in which management information about the optical disc medium is redundantly stored, the plurality of areas being concentrically formed, the management information being updated, the device comprising: a spindle motor for rotating the optical disc medium; a pickup for writing data to and reading data from the optical disc medium; a read/write circuit for processing read and write signals input to and output from the pickup; a servo circuit for controlling rotation of the spindle motor and movement of the pickup; a microprocessor for controlling a read operation of the pickup through the read/write circuit and the servo circuit and for setting read/write conditions for the device based on the management information read from the optical disc medium; and control memory for storing control conditions and the read/write conditions set by the microprocessor; wherein the management information about the optical disc medium includes a first management information group, a second management information group, and third management information, the third management information including conditions for setting a read/write operation and stored in the inner circumferential area of the optical disc medium, the first and second management information groups each including a valid address of the third management information and stored in the inner circumferential area and the outer circumferential area of the optical disc medium, respectively; and wherein the pickup performs the steps of: reading the first management information group from the inner circumferential area; retrieving the third management information based on the valid address included in the first management information group; moving to the outer circumferential area and reading the second management information group; and if the update count of the second management information group is higher than that of the first management information group, moving to the inner circumferential area and retrieving the third management information based on the valid address included in the second management information group.

According to another aspect of the present invention, the data read/write device is further configured such that: the first and second management information groups about the optical disc medium include a plurality of redundant copies of management information; and the pickup further performs the steps of: reading the plurality of copies of the management information included in the-first and second management information groups in the same order as they are updated; if one of the plurality of copies of the management information has been properly read, avoiding reading the remaining copies of the management information, or reducing the maximum allowable retry count before reading the remaining copies of the management information, the maximum allowable retry count indicating the maximum number of times a read operation can be retried when it fails; and retrieving the third management information based on the valid address included in the one of the plurality of copies of the management information whose update count is highest.

According to still another aspect of the present invention, the data read/write device is further configured such that: the first and second management information groups about the optical disc medium include a plurality of copies of a defect information list and a plurality of copies of the start address of the defect information list, the defect information list listing defect locations and spare locations on the optical disc medium; and the pickup further performs the steps of: reading the plurality of copies of the defect information list included in the first and second management groups in the same order as they are updated; if one of the plurality of copies of the defect information list has been properly read, reading only the first portion of each remaining copy of the defect information list, the first portion holding information including the update count of the copy of the defect information list; and if the update count of a newly read copy of the defect information list is not higher than that of the above read copy of the defect information list, avoiding reading the remaining portions of each remaining copy of the defect information list.

According to yet another aspect of the present invention, the data read/write device is further configured such that: the inner circumferential area of the optical disc medium includes a test write area used to set the write power to write data to the optical disc medium; and if the pickup is on the inner circumferential side of the test write area when it has finished retrieving the management information, the pickup moves to a location on the outer circumferential side of the test write area and assumes a wait state.

Yet another aspect of the present invention provides a data read/write method for writing data to and reading data from an optical disc medium having thereon a plurality areas in which management information about the optical disc medium is redundantly stored, wherein the plurality areas are concentrically formed and the management information is updated, wherein the management information about the optical disc medium includes a first management information group, a second management information group, and third information, the third management information including conditions for setting a read/write operation and stored in the inner circumferential area of the optical disc medium, the first and second management information groups each including a valid address of the third management information and stored in the inner circumferential area and the outer circumferential area of the optical disc medium, respectively, and wherein the method comprises the steps of: reading the first management information group from the inner circumferential area; retrieving the third management information based on the valid address included in the first management information group; reading the second management information group from the outer circumferential area; and if the update count of the second management information group is higher than that of the first management information group, retrieving the third management information based on the valid address included in the second management information group.

The present invention provides a reliable easy-to-use data read/write device and method adapted to efficiently retrieve management information from the optical disc medium and thereby reduce the device setup time.

BRIEF DESCRIPTION OF THE DRAWINGS

These and other features, objects, and advantages of the present invention will become more apparent from the following description when taken in conjunction with the accompanying drawings.

FIG. 3 (including FIGS. 3A and 3B) is a diagram showing exemplary management information held in a DDS and a DFL shown in FIG. 2.

DETAILED DESCRIPTION OF THE PREFERRED EMBODIMENTS

Preferred embodiments of the present invention will now be described with reference to the accompanying drawings.

First Embodiment

Figure 1:
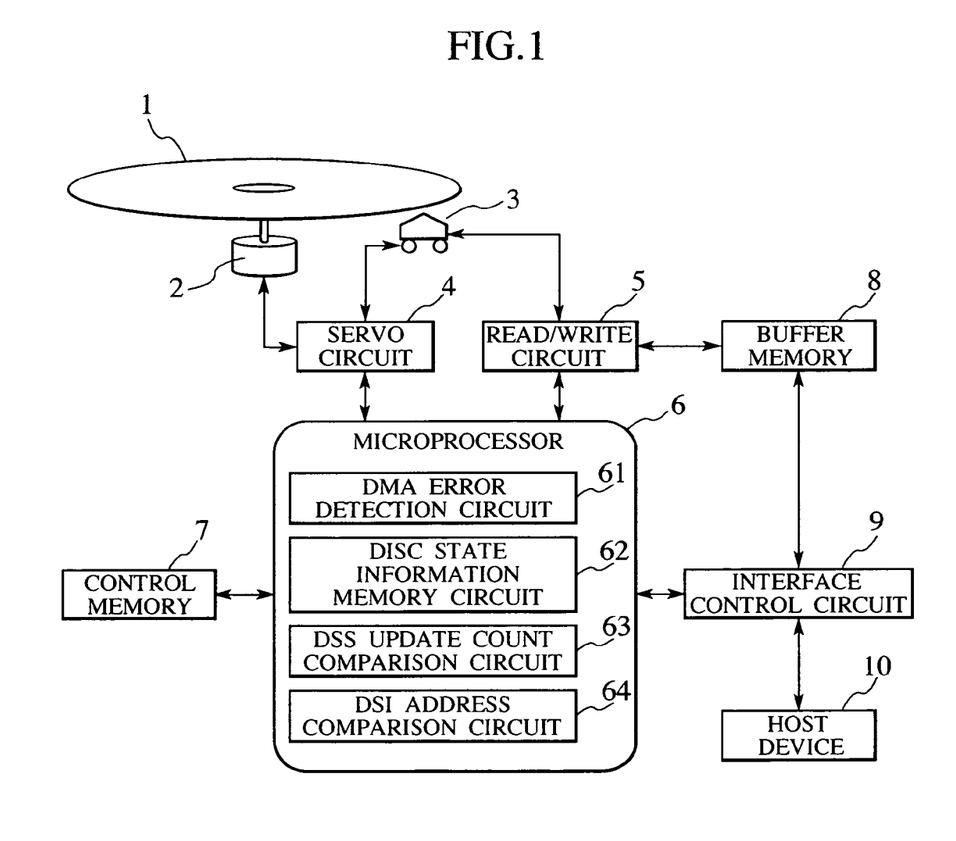
FIG. 1 is a block diagram showing the configuration of an exemplary data read/write device, namely an optical disc device, according to the present invention.

FIG. 1 is a block diagram showing the configuration of an exemplary data read/write device, namely an optical disc device, according to the present invention. Referring to the figure, a spindle motor 2 rotates an optical disc 1 (a recording medium) at a predetermined rotational speed. A pickup 3 includes a laser light source, a photodetector, and an optical lens system and irradiates the optical disc 1 with a laser beam to write data to or read data from the disc. A servo circuit 4 controls the rotation of the spindle motor 2 and the position of the pickup 3 in a disc radial direction and in tracking and focusing directions. A read/write circuit 5 performs read processing including digitization, demodulation, decode, error correction, etc. on the signal read by the pickup 3, as well as performing write processing including modulation, compensation, etc. on the signal supplied to the pickup 3. The data to be written to or read from the optical disc is temporarily stored in buffer memory 8. The data is transmitted to or received from the host device 10 (for example, a personal computer) connected to the optical disc device through an interface control circuit 9. A microprocessor 6 controls the servo circuit 4, the read/write circuit 5, and the interface control circuit 9 in response to a command from the host device 10 and thereby controls various processing operations such as read and write operations. Control memory 7 stores the programs and data required for these control operations.

According to the present embodiment, when a read or write operation is performed, the pickup 3 accesses management information storage areas such as DMAs provided on the inner and outer circumferential sides of the optical disc 1 (a seek operation) and reads management information. The microprocessor 6 controls the access sequence of the pickup 3 and performs a setup operation on the device based on the retrieved management information, setting appropriate read or write conditions for the loaded optical disc. To efficiently retrieve valid management information at that time, the microprocessor 6 includes: a DMA error detection circuit 61 for determining whether management information has been properly read; a disc state information memory circuit 62 for temporarily storing the read management information; a DDS update count comparison circuit 63 for comparing the update count included in each piece (or each copy) of management information; and a DSI address comparison circuit 64 for checking whether the address of one piece of management information coincides with that of another piece.

Figure 2:
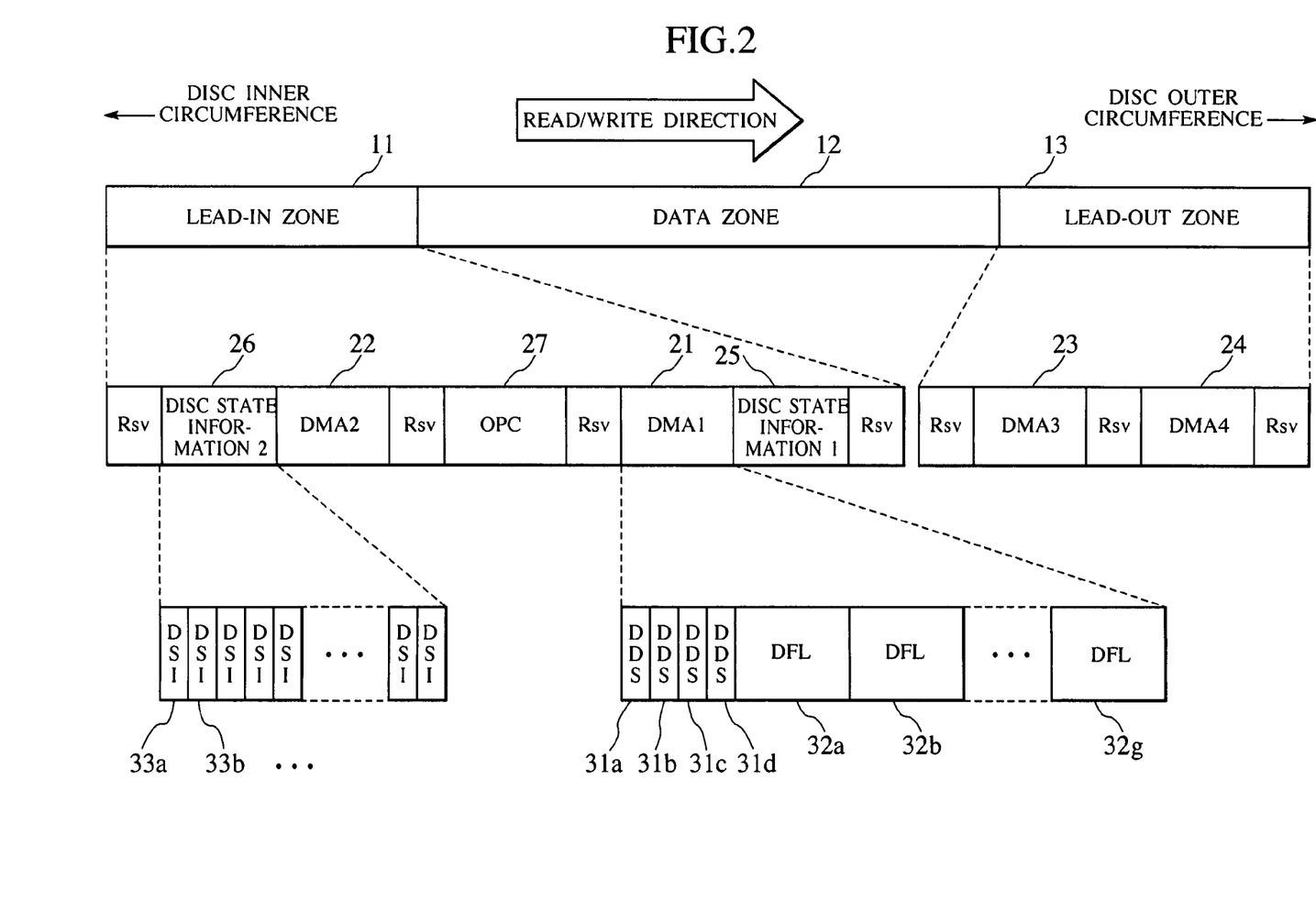
FIG. 2 is a diagram showing the configuration of the areas of a high-density rewritable optical disc according to the present invention.

FIG. 2 is a diagram showing an exemplary configuration of the areas of a high-density rewritable optical disc according to the present embodiment. The optical disc 1 has a lead-in zone 11, a lead-out zone 13, and a data zone 12 thereon. The lead-in zone 11 and lead-out zone 13, which store management information, are located on the inner and outer circumferential sides of the optical disc 1, respectively, and the data zone 12, which stores user data, etc., is located between them. According to the present embodiment, the disc is assumed to have four disc management areas (DMAs) and two disc state information areas. The disc management areas store information about the locations of defects and the corresponding spare areas on the disc, while the disc state information areas store read/write conditions such as the write power applied to the disc. Thus, these pieces of information are redundantly stored in a plurality of areas (that is, disc management areas or disc state information areas) to increase the reliability of read operation. The lead-in zone 11 includes a DMA 1 (indicated by reference numeral 21), a DMA 2 (indicated by reference numeral 22), a disc state information area 1 (indicated by reference numeral 25), and a disc state information area 2 (indicated by reference numeral 26). The DMAs 1 and 2 are radially spaced apart from each other by a test write area (OPC) 27. The disc state information areas 1 and 2 are also spaced apart from each other. This arrangement allows the disc to have increased resistance to defects and flaws. Further, the lead-out zone 13 includes a DMA 3 (indicated by reference numeral 23) and a DMA 4 (indicated by reference numeral 24). It should be noted that the symbol Rsv denotes reserved areas.

Each DMA stores four DDSs (disc definition structures) 31*a* to 31*d* which are repeatedly updated and seven DFLs (defect lists) 32*a* to 32*g* for holding defect location information. Specifically, each DDS holds the update count and address information about management information. These pieces of information are used to retrieve a valid DFL, as described later.

On the other hand, the disc state information areas 1 and 2 are each divided into a plurality of regions storing disc state information (DSI) 33*a*, 33*b*, and so on. Valid DSI is retrieved based on the update count and the address information held in each DDS. These update counts are compared to determine which one or ones of the plurality of pieces (or copies) of information are most recently updated. That is, the information whose update count is highest is selected to determine the device setup conditions.

Figure 3A:
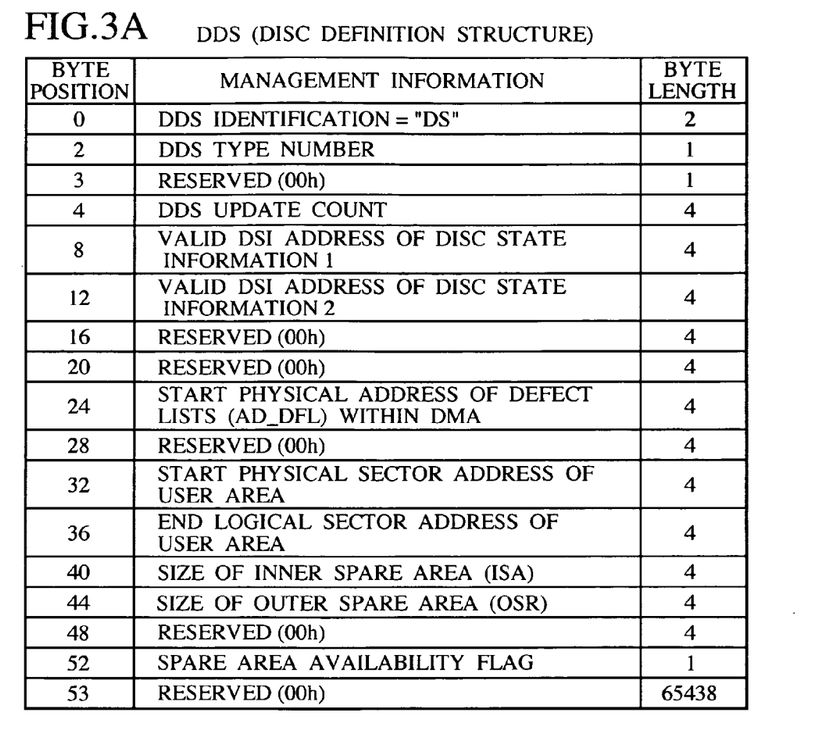
Figure 3B:
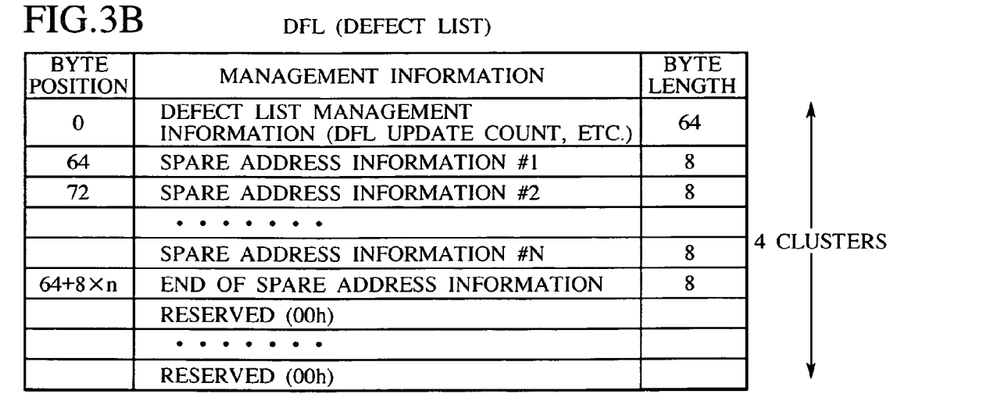

FIG. 3 (including FIGS. 3A and 3B) is a diagram showing exemplary management information held in each DDS (disc definition structure) and DFL (defect list) shown in FIG. 2.

Specifically, FIG. 3A shows the information held in each DDS (31*a*, 31*b*, and so on). The update count of the DDS is stored in the $4^{th}$-$7^{th}$ byte positions. The valid DSI address of the disc state information 1 is stored in the $8^{th}$-$11^{th}$ byte positions, while that of the disc sate information 2 is stored in the $12^{th}$-$15^{th}$ byte positions. This allows valid disc state information 1 and 2 to be retrieved. Further, the $24^{th}$-$27^{th}$ byte positions together store the defect list start physical address (AD_DFL) within the DMA, allowing a valid DFL to be retrieved.

FIG. 3B shows the information held in each DFL (32*a*, 32*b*, and so on). Each DFL is made up of 4 clusters. The $0^{th}$-$63^{rd}$ byte positions (of the first, or head, cluster) together store DFL management information including the update count of the DFL. The $64^{th}$ and subsequent byte positions (covering the second to fourth clusters) together store spare (or replacement) address information indicating the physical addresses of each cluster to be replaced and its replacement cluster. That is, the second to fourth clusters store spare (or replacement) address information, but not DFL update count information.

The present embodiment provides a method for efficiently retrieving valid management information from a disc storing a plurality of pieces (or copies) of management information. Before this method is described, however, a conventional method will be described to facilitate the understanding of the present embodiment.

Figure 7:
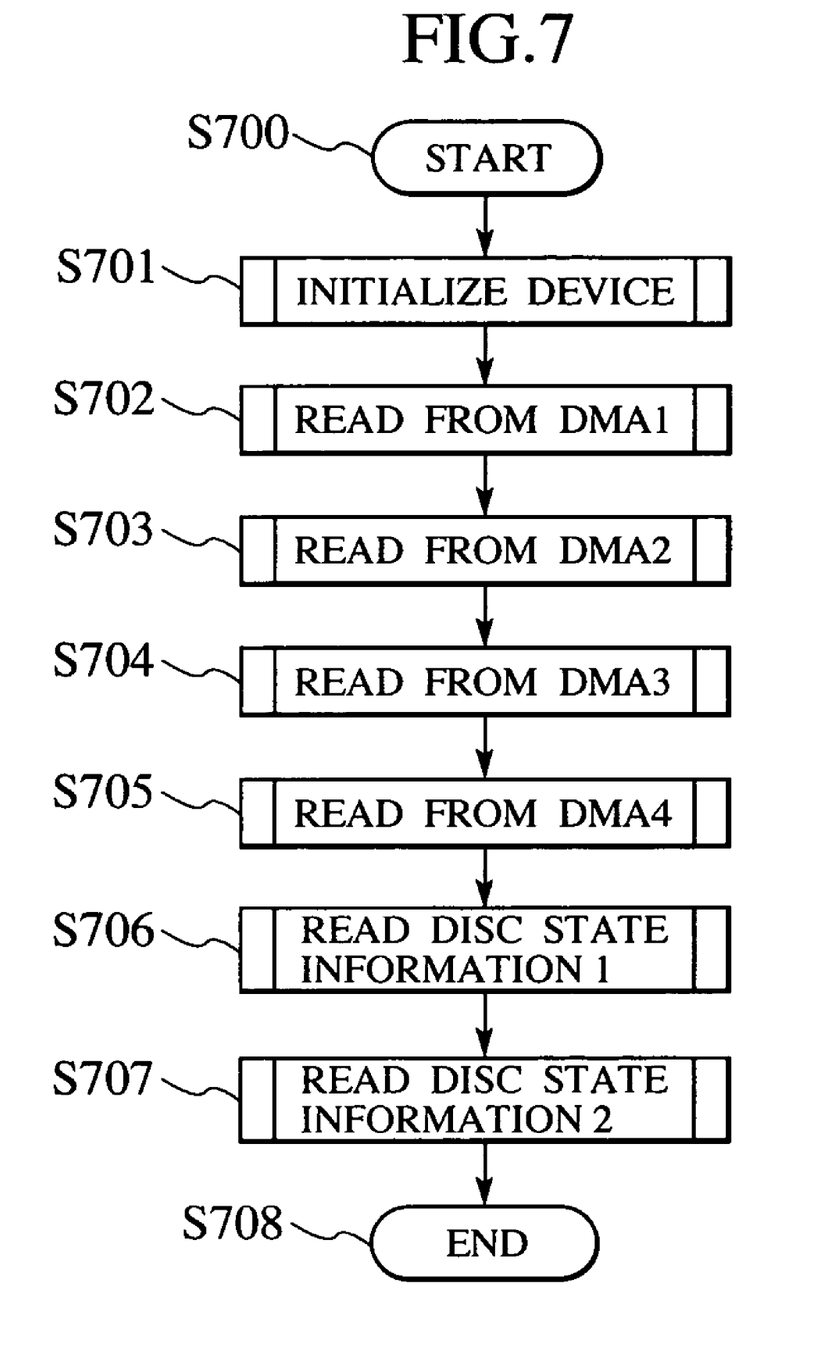
FIG. 7 is a flowchart illustrating a conventional basic sequence of steps performed to retrieve management information.
Figure 8:
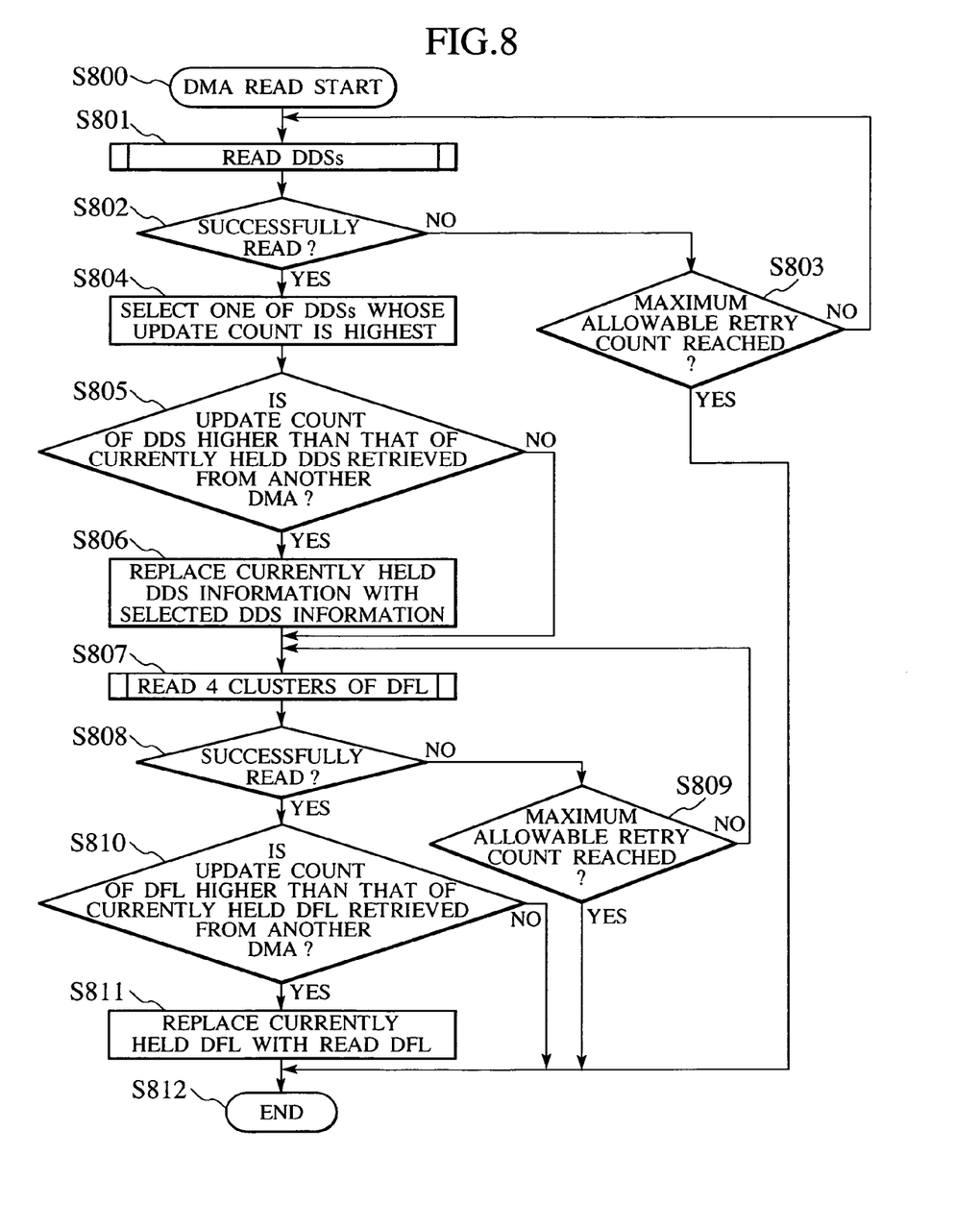
FIG. 8 is a flowchart illustrating a conventional detailed sequence of steps performed to retrieve management information.

FIGS. 7 and 8 are flowcharts illustrating conventional sequences of steps performed to retrieve valid management information (DFL and disc state information) from the disc shown in FIG. 2. Specifically, FIG. 7 shows a basic sequence of steps and FIG. 8 shows a detailed sequence of steps of reading a DMA shown in FIG. 2.

Referring to FIG. 7, all of the four DMAs 1 to 4 are sequentially read at steps S702 to S705. Then, based on the update count held in each DDS, it is determined which one of the DMAs has been most recently updated. After that, steps S706 and S707 read valid disc state information 1 and 2 based on the valid DSI addresses retrieved from the most recently updated DMA.

FIG. 8 shows how to read information from a DMA. First, the four DDSs stored in the DMA are read at step S801. Then, at step S802 it is determined whether these DDSs have been successfully read, and if no, the read operation is repeated until all of the 4 DDSs have been successfully read (or a predetermined maximum allowable retry count has been reached at step S803). If the maximum allowable retry count has been reached at step S803, then the DMA reading process ends. If all DDSs have been successfully read, the one of the read 4 DDSs whose update count is highest is selected at step S804. Then, at step S805 it is determined whether the update count of the selected DDS is higher than that of the currently held DDS retrieved from another DMA. If yes, the currently held DDS information is replaced by the selected DDS information at step S806. If no, the currently held DDS information is not replaced.

Then, step S807 reads the DFL specified by the DFL address (AD_DFL) included in the retrieved DDS information (held in the most recently updated DDS). At that time, all of the 4 clusters making up the DFL are read. Then, at step S808 it is determined whether the above read operation has been successful. If no, the read operation is repeated until all 4 clusters making up the DFL have been successfully read (or a predetermined maximum allowable retry count has been reached at step S809). If the maximum allowable retry count has been reached at step S809, then the DMA reading process ends. If, on the other hand, all 4 clusters have been successfully read, at step 810 it is determined whether the update count of the DFL is higher than that of the currently held DFL retrieved from another DMA. If yes, the currently held DFL information is replaced by the read DFL information at step 811. If no, the currently held DFL information is not replaced.

The above conventional sequence of steps is summarized as follows:

(1) reading the 4 DDSs stored in each DMA and obtaining both the DDS whose update count is highest and the DFL specified by AD_DFL of this DDS;

(2) if the update count of the DDS is higher than that of the currently held DDS (set as the most recently updated DDS), replacing the currently held DDS information with the retrieved DDS information; if the update count of the DFL is higher than that of the currently held DFL (set as the most recently updated DFL), replacing the currently held DFL information with the retrieved DFL information; and (3) after reading from all DMAs, retrieving disc state information based on the valid DSI location indicated by the DDS information whose update count is highest.

Figure 9:
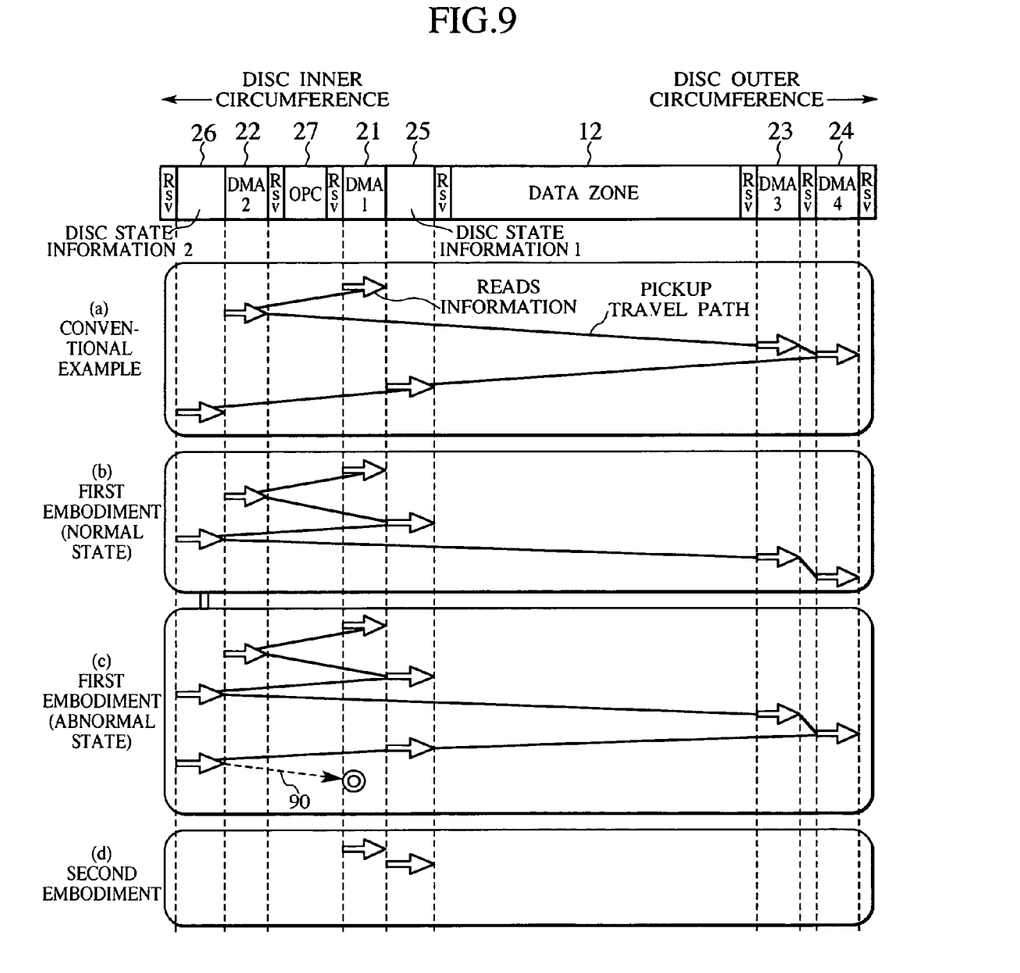
FIG. 9 (including FIGS. 9($a$) to 9($d$)) is a diagram schematically showing paths traveled by a pickup to retrieve management information.

FIG. 9 (including FIGS. 9A to 9D) is a diagram schematically showing the paths traveled by the pickup to retrieve management information.

Specifically, FIG. 9(a) shows the path traveled by the pickup in the case of the above conventional sequence of steps. The pickup sequentially scans the 4 DMAs and 2 pieces of disc state information in the same order as they are updated. That is, the scanning sequence is such that DMA 1→DMA 2→DMA 3→DMA 4→disc state information 1→disc state information 2. As can be seen from the figure, the pickup must travel from the inner circumferential side to the outer circumferential side across the data zone and return. Since there is a limit to the traveling speed of the pickup, it takes a long time to retrieve all of the information.

Figure 4:
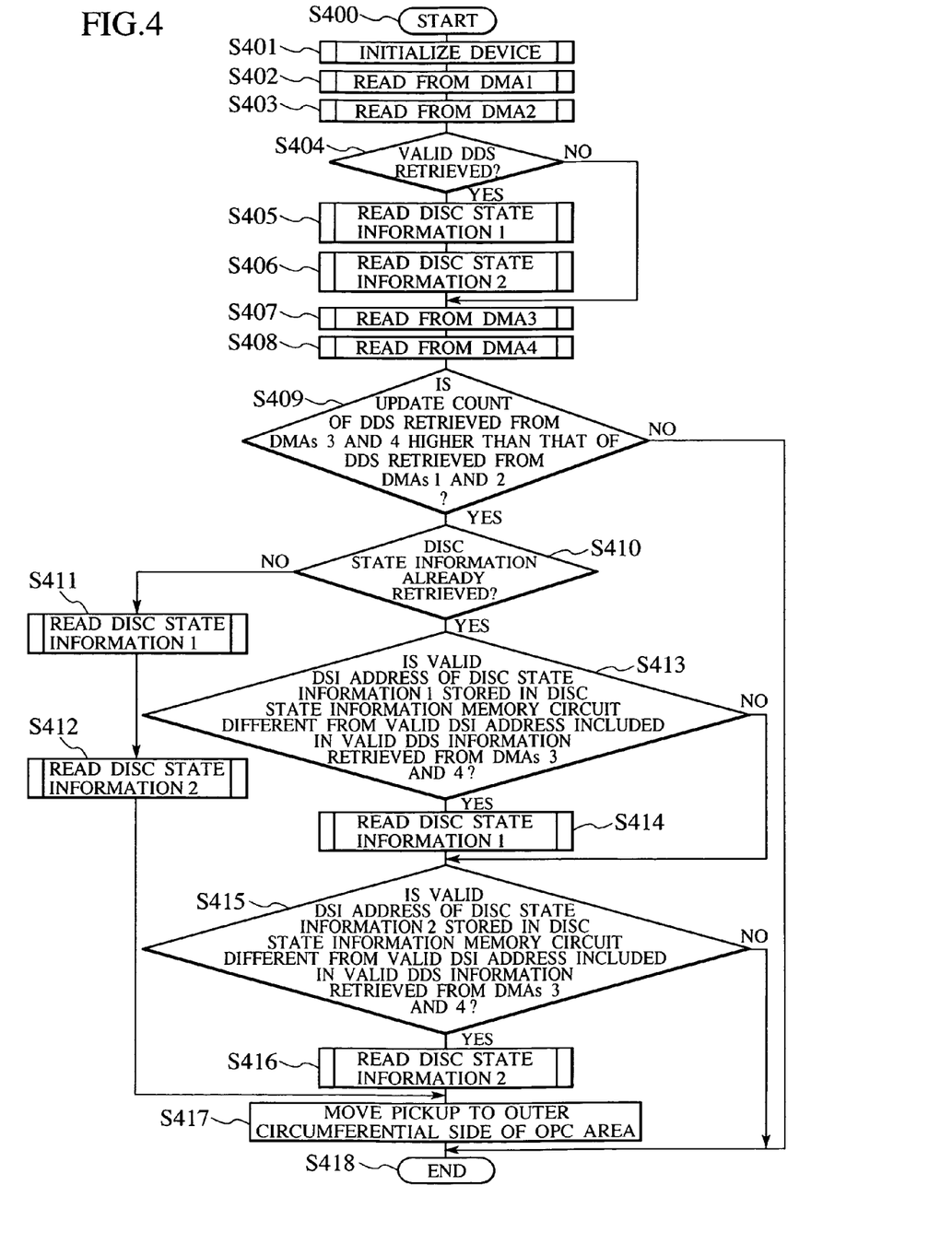
FIG. 4 is a flowchart illustrating a sequence of steps performed to retrieve management information according to an embodiment of the present invention.

FIG. 4 is a flowchart illustrating a sequence of steps performed to retrieve management information according to a first embodiment of the present invention. The first embodiment is characterized in that if the DMA error detection circuit 61 within the microprocessor 6 determines that the DDSs stored on the inner circumferential side have been properly read, the microprocessor 6 controls the servo circuit 4 and the read/write circuit 5 so as to perform the following series of steps: reading the disc state information stored on the inner circumferential side; moving the pickup to the outer circumferential side; and reading the DDSs stored on that side.

Specifically, referring to FIG. 4, first the DMAs 1 and 2 on the inner circumferential side are read at steps 402 and 403, respectively. Then, at step S404, the DMA error detection circuit 61 determines whether the DDS information stored in each DMA has been properly read. That is, the DMA error detection circuit 61 reads the 4 DDSs stored in each DMA and retrieves the DDS information of the DDS whose update count is highest (that is, the valid DDS or the most recently updated DDS). Then, the microprocessor 6 reads the valid disc state information 1 and disc state information 2 specified by the valid DSI addresses held in the retrieved valid DDS and stores them in the disc state information memory circuit 62 at steps S405 and S406. Then, the pickup is moved to the outer circumferential side to read from the DMAs 3 and 4 at steps S407 and S408. If the DMA error detection circuit 61 has failed to obtain a valid DDS at step S404, the microprocessor 6 controls the servo circuit 4 and the read/write circuit 5 so as to move the pickup directly to the outer circumferential side without reading the disc state information 1 and 2 and to read from the DMAs 3 and 4 on that side.

Then, at step S409, the update count comparison circuit 63 within the microprocessor 6 determines whether the update count of the valid DDS retrieved from the DMAs 3 and 4 on the outer circumferential side is higher than that of the valid DDS retrieved from the DMAs 1 and 2 on the inner circumferential side. If yes, the microprocessor 6 controls the servo circuit 4 and the read/write circuit 5 so as to newly read disc state information 1 and 2 (as described later in detail). If no, the information retrieval process ends at step S418. It should be noted that since updating of the management information is carried out in the order from the DMA 1 to the DMA 4 (that is, DMA 1→DMA 2→DMA 3→DMA 4), the update counts of the DDSs retrieved from the DMAs 3 and 4 on the outer circumferential side rarely become higher than those of the DDSs read from the DMAs 1 and 2 on the inner circumferential side and hence the decision at step S409 is no in most cases.

If the decision at step S409 is yes, at step S410 it is determined whether disc state information 1 and disc state information 2 have been already obtained at steps S405 and S406, respectively. If no, the microprocessor 6 reads the disc state information 1 and the disc state information 2 specified by the valid DSI addresses included in the valid DDS information retrieved from the DMAs 3 and 4 and stores them in the disc state information memory circuit 62 at steps S411 and S412. If yes, at step S413 the DSI address comparison circuit 64 determines whether the valid DSI address of the disc state information 1 stored in the disc state information memory circuit 62 is different from the corresponding valid DSI address included in the valid DDS information retrieved from the DMAs 3 and 4. If they are different, the microprocessor 6 reads the disc state information 1 specified by the valid DSI address retrieved from the DMAs 3 and 4 and stores it in the disc state information memory circuit 62 at step S414. If they are the same, on the other hand, the disc state information 1 currently stored in the disc state information memory circuit 62 is not replaced. Likewise, at step S415, the DSI address comparison circuit 64 determines whether the valid DSI address of the disc state information 2 stored in the disc state information memory circuit 62 is different from the corresponding valid DSI address included in the valid DDS information retrieved from the DMAs 3 and 4. If they are different, the microprocessor 6 reads the disc state information 2 specified by the valid DSI address retrieved from the DMAs 3 and 4 and stores it in the disc state information memory circuit 62 at step S416. If they are the same, on the other hand, the disc state information 2 currently stored in the disc state information memory circuit 62 is not replaced.

This completes the retrieval of the management information, allowing the device to be set up based on the retrieved information. When the management information retrieval process has been completed, if the pickup has been left on the inner circumferential side of the OPC area 27, the microprocessor 6 preferably performs control so as to move the pickup to the outer circumferential side of the OPC area 27 (a seek operation) at step S417. The pickup is left on the inner circumferential side of the OPC area 27 if step S412 or S416 is performed, at which disc state information 2 on the inner circumferential side is read. The OPC area is repeatedly irradiated with a high power laser beam in order to adjust the write power. Therefore, the recording film on the OPC area often suffers damage. If the pickup passes over such an area, the read signal and the tracking signal become unstable, which might lead to "servo runout". Once "servo runout" has occurred, it takes time to restore the device to an appropriate state. Therefore, moving the pickup to the outer circumferential side of the OPC area after completion of the management information retrieval process allows properly performing the subsequent read/write operation after device setup.

FIGS. 9B and 9C show the paths traveled by the pickup when the above sequence of steps is performed. Specifically, FIG. 9(b) shows the travel path of the pickup when the decision at step S409 of FIG. 4 is no (that is, when a normal disc is used). In this case, after reading disc state information 1 and 2 on the inner circumferential side, the pickup moves to the outer circumferential side and reads from the DMAs 3 and 4. Then, the information retrieval process ends. The management information is redundantly stored in the DMAs 1 to 4 and updated in the order from the DMA 1 to the DMA 4 (that is, DMA 1→DMA 2→DMA 3→DMA 4). Therefore, the DMAs (1 and 2) on the inner circumferential side are the first to be updated. This means that even if some abnormality, e.g., power-off of the device has occurred during the update process, the inner circumferential side DMAs 1 and 2 are likely to store the most recently updated management information (that is, the information stored in these DMAs are reliable). Therefore, in many cases, it is enough to read data from the DMAs 1 and 2. In the case of a normal disc shown in FIG. 9(b), the pickup need not return from the outer circumferential side to the inner circumferential side, resulting in a great reduction in the time required to complete the update process, as compared to the conventional sequence of steps shown in FIG. 9(a).

On the other hand, FIG. 9(c) shows the travel path of the pickup when the decision at step S409 is yes (that is, for example, when a disc having a defect on its inner circumferential side is used). In this case, since the information stored in the inner side DMAs 1 and 2 is incomplete or damaged, the pickup must be returned from the outer circumferential side to the inner circumferential side to read disc state information again based on the information stored in the DMAs 3 and 4 on the outer circumferential side. However, the case shown in FIG. 9(c) where the information stored in the DMAs 1 and 2 on the inner circumferential side is incomplete or damaged rarely happens, in which the rate of occurrence is low.

Referring to FIG. 9(c), broken line 90 indicates the path traveled by the pickup at step S417 of FIG. 4 when the pickup is moved to a position (indicated by the symbol ⊚) on the outer circumferential side of the OPC area after completion of the information retrieval process.

Second Embodiment

Figure 5:
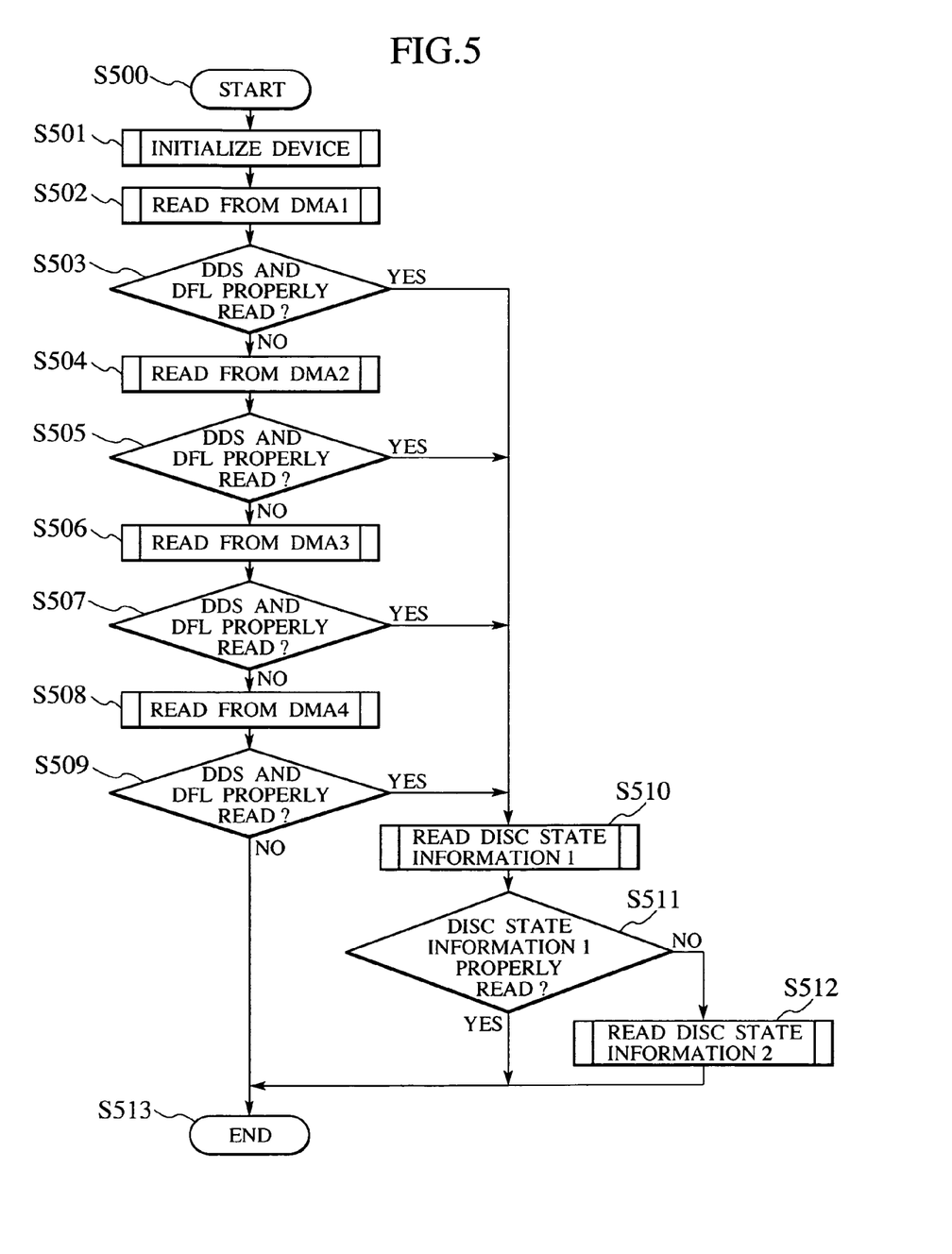
FIG. 5 is a flowchart illustrating a sequence of steps performed to retrieve management information according to another embodiment of the present invention.

FIG. 5 is a flowchart illustrating a sequence of steps performed to retrieve management information according to a second embodiment of the present invention. The second embodiment is also directed to the above data read/write device shown FIG. 1 and to the above optical disc shown in FIGS. 2 and 3. According to the present embodiment, each DMA and each piece of disc state information are read in the same order as they are updated, as is the case with the first embodiment. This embodiment is characterized in that: if one DMA has been properly read, no read operation is performed on the subsequent DMAs; and if one piece of disc state information has been properly read, no read operation is performed on the other piece of disc state information.

Referring to FIG. 5, first the microprocessor 6 performs control so as to read from the DMA 1 at step S502. The DMAs are read in the order from the DMA 1 to DMA 4. At step S503, the DMA error detection circuit 61 within the microprocessor 6 determines whether the DDS information and DFL information stored in the DMA 1 have been properly read. If yes, the microprocessor 6 reads disc state information 1 based on the DDS information and stores it in the disc state information memory circuit 62 at step S510. If at step S511 the DMA error detection circuit 61 determines that the microprocessor 6 has properly read the disc state information 1, the information retrieval process ends at step 513. If, on the other hand, the DMA error detection circuit 61 determines that the microprocessor 6 has not properly read the disc state information 1 (that is, the decision at step S511 is no), the microprocessor 6 reads disc state information 2, instead of the disc state information 1, and stores it in the disc state information memory circuit 62 at step S512.

If at step S503 the DMA error detection circuit 61 determines that the information stored in the DMA 1 has not been properly read, the microprocessor 6 reads information from the DMA 2 and stores it in the disc state information memory circuit 62 at step S504. Then, at step S505, the DMA error detection circuit 61 determines whether the DDS information and DFL information stored in the DMA 2 have been properly read. If yes, the microprocessor 6 reads disc state information 1 based on the DDS information and stores it in the disc state information memory circuit 62 at step S510. If the DMA error detection circuit 61 determines that the microprocessor 6 has not properly read the disc state information 1, the microprocessor 6 reads disc state information 2 and stores it in the disc state information memory circuit 62 at step S512. Then, the information retrieval process ends.

The above information retrieval process is repeated on the remaining DMAs until one DMA or one piece of disc state information has been properly read. Thus, this method reads information stored in each DMA and each piece of disc state information in the same order as they are updated. The update count of each piece of data (or information) is incremented when it is updated. That is, the first data in the update order usually has the same or higher update count than the second and subsequent data, and the second data usually has the same or higher update count than the third and subsequent data, and so on (even if the update operation is interrupted). Therefore, the data retrieved first is expected to be highly reliable, eliminating the need to retrieve the remaining data.

FIG. 9(d) shows a path traveled by the pickup when the sequence of steps of the present embodiment is performed (specifically, when the decision at step S503 and the decision at step S511 in FIG. 5 are yes). As can be seen from the figure, the pickup only moves from the DMA 1 to the disc state information 1 on the inner circumferential side. After this, the information retrieval process ends. Therefore, this method can reduce the read time by a significant amount while efficiently retrieving reliable data.

According to a variation of the present embodiment, the DMAs 1 and 2 on the inner circumferential side form one group and the DMAs 3 and 4 on the outer circumferential side form another group. With this arrangement, the microprocessor reads DMAs in groups. If at least one DMA in the inner circumferential group has been properly read, the information retrieval process ends. This sequence of steps is a variation of the sequence shown in FIG. 5, in which the processing jumps from step S502 to step S504 and from step S506 to S508.

Third Embodiment

Figure 6:
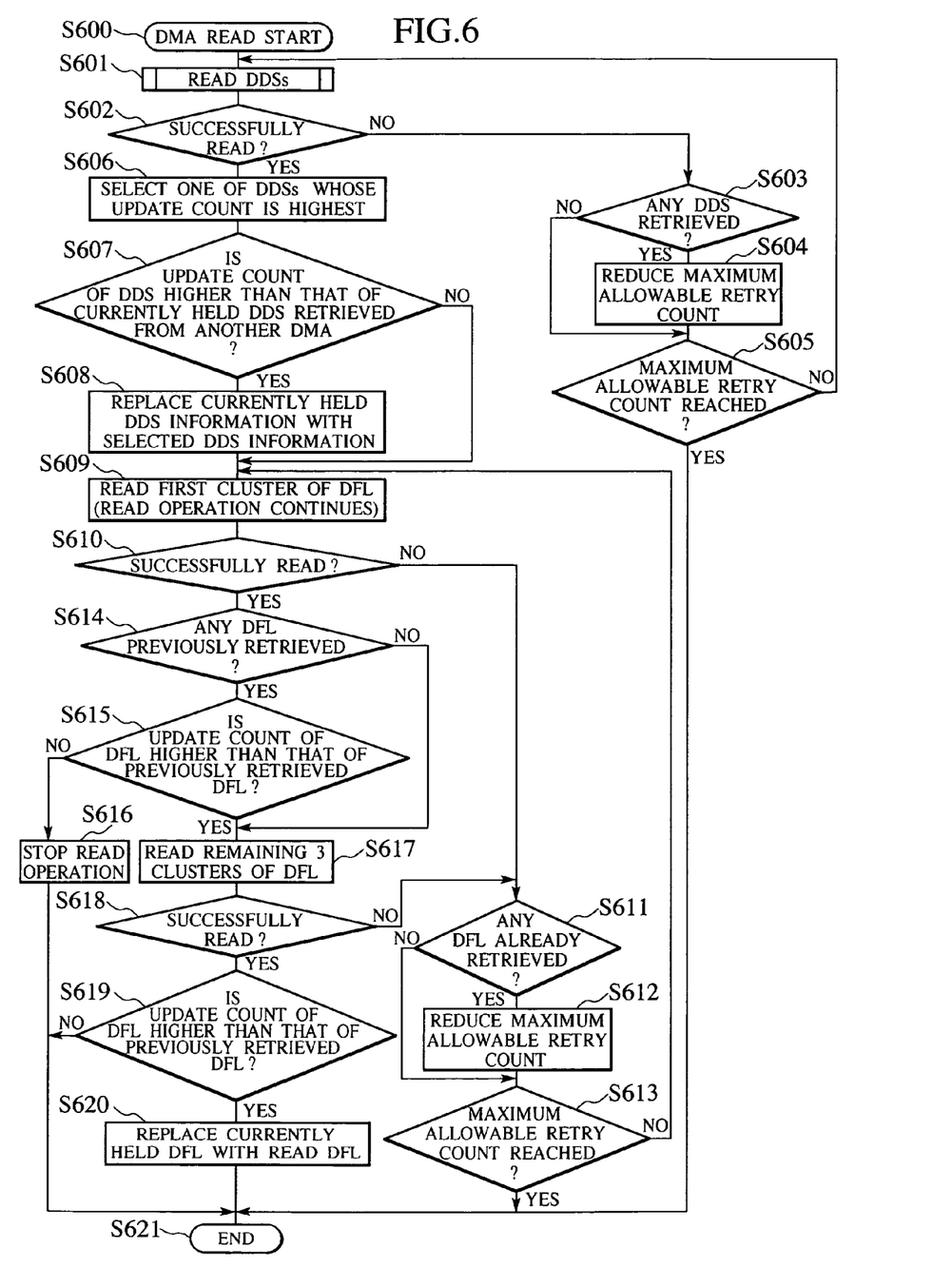
FIG. 6 is a flowchart illustrating a sequence of steps performed to retrieve management information according to still another embodiment of the present invention.

FIG. 6 is a flowchart illustrating a sequence of steps performed to retrieve management information according to a third embodiment of the present invention. This embodiment modifies part of the sequence shown in FIG. 8 for reading from a DMA. According to the present embodiment, step S803 for retry operation shown in FIG. 8 is modified such that if (at step S603 of FIG. 6) it is determined that there is a retrieved DDS, the maximum allowable retry count is reduced to speed up the subsequent read operations. Further, step S809 for retry operation shown in FIG. 8 is modified such that if (at step S611 of FIG. 6) it is determined that there is a retrieved DFL, the maximum allowable retry count is reduced to speed up the subsequent read operations. Further, if at step S807 of FIG. 8 a DFL (consisting of 4 clusters) has been properly read, only the first cluster of each subsequent DFL is read, and if the update count of the properly read DFL is not higher than that of the currently held DFL, the remaining 3 clusters are not read to speed up the read operation.

The sequence of steps shown in FIG. 6 will now be described. First, at step S601, the microprocessor 6 performs control so as to read the 4 DDSs stored in a DMA. Then, at step S602 the DMA error detection circuit 61 within the microprocessor 6 determines whether these DDSs have been successfully read. If no, at step S603 it is determined whether there is any DDS that has been retrieved. If there is, the maximum allowable retry count is reduced at step S604 and then at step S605 the retry operation is repeated until the reduced maximum allowable retry count is reached.

Then, step S606 selects the one of the 4 read DDSs whose update count is highest. At step S607, the DDS update count comparison circuit 63 determines whether the update count of the selected DDS is higher than that of the currently held DDS retrieved from another DMA. If yes, the currently held DDS is replaced by the selected DDS at step S608. If no, the currently held DDS is not replaced.

The next step reads the DFL specified by the DFL address (AD_DFL) included in the retrieved DDS information (held as the most recently updated DDS information). It should be noted that each DFL is made up of 4 clusters and the update count of the DFL is stored in the first cluster. Specifically, according to the present embodiment, only the first cluster of the DFL is first read at step S609. Then, at step S610 it is determined whether the first cluster has been successfully read. If no, at step S611 it is determined whether there is any DFL that has been already retrieved. If the decision at step S611 is yes, the maximum allowable retry count is reduced at step S612 and then at step S613 the retry operation is repeated until the reduced maximum allowable retry count is reached.

If the first cluster of the DFL has been successfully read (that is, the decision at step S610 is yes), at step S614 it is determined whether there is any DFL that has been previously successfully read. If yes, at step S615 it is determined whether the update count of the current DFL is higher than that of the previously read DFL. If the decision at step S615 is no, the information retrieval process ends at step S616. If the decision at step S615 is yes, the remaining 3 clusters of the DFL are read at step S617. Then, at step S618, it is determined whether these 3 clusters have been successfully read. If no, the process proceeds to step S611 and then the retry operation is performed.

If the 3 clusters have been successfully read (that is, the decision at step S618 is yes), at step S619 it is determined whether the update count of the DFL is higher than that of the currently held DFL (set as the most recently updated DFL). If yes, the currently held DFL information is replaced by the read DFL information at step S620. If no, the currently held DFL information is not replaced.

The above sequence of steps allows the read operation to be sped up, as follows.

(1) If (at step S603) it is determined that there is a retrieved DDS, the maximum allowable retry count is reduced at step S604. Further, if (at step S611) it is determined that there is a retrieved DFL, the maximum allowable retry count is reduced at step S612. These arrangements reduce the time required to complete the retry operation in the event of an abnormality. Since each piece of data is read in the same order as it is updated, the data retrieved first is highly reliable, allowing the maximum allowable retry count for the subsequent data to be reduced.

(2) If (at step S611) it is determined that there is a retrieved DFL, only the first cluster of each remaining DFL is read at step S609. Furthermore, if the process proceeds to step S616, the process ends without reading the remaining 3 clusters. This arrangement reduces the time required to read DFLs.

Although the present invention has been described in conjunction with the exemplary embodiments described above, it should be understood that many variations will become apparent to those skilled in the art since the elements of each embodiment can be combined with, or substituted for, the elements of other embodiments except where such elements are mutually exclusive.

Further, although each embodiment of the present invention has been described with reference to the case where the disc management information is disc defect management information or disc state information such as write power, the present invention is not limited to these particular types of information. The present invention can be applied to any information required to set up the device. According to the present invention, management information is redundantly stored in a plurality of areas on the disc. Although each embodiment of the present invention has been described with reference to the case where these areas are provided on both the inner circumferential side and the outer circumferential side (or within the lead-in zone and the lead-out zone) of the disc that sandwich the data zone, the present invention is not limited to this particular arrangement. The disc areas for redundantly storing management information may be determined depending on the format of the disc.

While we have shown and described several embodiments in accordance with our invention, it should be understood that disclosed embodiments are susceptible to changes and modifications without departing from the scope of the invention. Therefore, we do not intend to be bound by the details shown and described herein but intend to cover all such details and modifications as fall within the ambit of the appended claims.

What is claimed is:

1. A device for writing data to and reading data from an optical disc medium having thereon a plurality of areas in which management information about the optical disc medium is redundantly stored, the plurality of areas being concentrically formed, the management information being updated, the device comprising:
   a spindle motor for rotating the optical disc medium;
   a pickup for writing data to and reading data from the optical disc medium;
   a read/write circuit for processing read and write signals input to and output from the pickup;

a servo circuit for controlling rotation of the spindle motor and movement of the pickup;

a microprocessor for controlling a read operation of the pickup through the read/write circuit and the servo circuit and for setting read/write conditions for the device based on the management information read from the optical disc medium; and control memory for storing control conditions and the read/write conditions set by the microprocessor;

wherein the management information about the optical disc medium includes a first management information group, a second management information group, and third management information, the third management information including conditions for setting a read/write operation and stored in the inner circumferential area of the optical disc medium, the first and second management information groups each including a valid address of the third management information and stored in the inner circumferential area and the outer circumferential area of the optical disc medium, respectively; and wherein the pickup performs the steps of:

reading the first management information group from the inner circumferential area;

retrieving the third management information based on the valid address included in the first management information group;

moving to the outer circumferential area and reading the second management information group; and if the update count of the second management information group is higher than that of the first management information group, moving to the inner circumferential area and retrieving the third management information based on the valid address included in the second management information group.

2. The device as claimed in claim 1, wherein:

the first and second management information groups about the optical disc medium include a plurality of redundant copies of management information; and the pickup further performs the steps of:

reading the plurality of copies of the management information included in the first and second management information groups in the same order as they are updated;

if one of the plurality of copies of the management information has been properly read, avoiding reading the remaining copies of the management information, or reducing the maximum allowable retry count before reading the remaining copies of the management information, the maximum allowable retry count indicating the maximum number of times a read operation can be retried when it fails; and retrieving the third management information based on the valid address included in the one of the plurality of copies of the management information whose update count is highest.

3. The device as claimed in claim 1, wherein:

the first and second management information groups about the optical disc medium include a plurality of copies of a defect information list and a plurality of copies of the start address of the defect information list, the defect information list listing defect locations and spare locations on the optical disc medium; and the pickup further performs the steps of:

reading the plurality of copies of the defect information list included in the first and second management groups in the same order as they are updated;

if one of the plurality of copies of the defect information list has been properly read, reading only the first portion of each remaining copy of the defect information list, the first portion holding information including the update count of the copy of the defect information list; and if the update count of a newly read copy of the defect information list is not higher than that of the read copy of the defect information list, avoiding reading the remaining portions of the each remaining copy of the defect information list.

4. The device as claimed in claim 1, wherein:

the inner circumferential area of the optical disc medium includes a test write area used to set the write power to write data to the optical disc medium; and if the pickup is on the inner circumferential side of the test write area when it has finished retrieving the management information, the pickup moves to a location on the outer circumferential side of the test write area and assumes a wait state.

5. A method for writing data to and reading data from an optical disc medium having thereon a plurality areas in which management information about the optical disc medium is redundantly stored, wherein the plurality areas are concentrically formed and the management information is updated, wherein the management information about the optical disc medium includes a first management information group, a second management information group, and third management information, the third management information including conditions for setting a read/write operation and stored in the inner circumferential area of the optical disc medium, the first and second management information groups each including a valid address of the third management information and stored in the inner circumferential area and the outer circumferential area of the optical disc medium, respectively, and wherein the method comprises the steps of:

reading the first management information group from the inner circumferential area;

retrieving the third management information based on the valid address included in the first management information group;

reading the second management information group from the outer circumferential area; and if the update count of the second management information group is higher than that of the first management information group, retrieving the third management information based on the valid address included in the second management information group.

6. The method as claimed in claim 5, wherein:

the first and second management information groups include a plurality of redundant copies of management information; and the method further comprises the steps of:

reading the plurality of copies of the management information included in the first and second management information groups in the same order as they are updated;

if one of the plurality of copies of the management information has been properly read, avoiding reading the remaining copies of the management information, or reducing the maximum allowable retry count before reading the remaining copies of the management information, the maximum allowable retry count indicating the maximum number of times a read operation can be retried when it fails; and retrieving the third management information based on the valid address included in the one of the plurality of copies of the management information whose update count is highest.

7. The method as claimed in claim 5, wherein:

the first and second management information groups include a plurality of copies of a defect information list and a plurality of copies of the start address of the defect information list, the defect information list listing defect locations and spare locations on the optical disc medium; and the method further comprises the steps of:

reading the plurality of copies of the defect information list included in the first and second management groups in the same order as they are updated;

if one of the plurality of copies of the defect information list has been properly read, reading only the first portion of each remaining copy of the defect information list, the first portion holding information including the update count of the copy of the defect information list; and if the update count of a newly read copy of the defect information list is not higher than that of the read copy of the defect information list, avoiding reading the remaining portions of the each remaining copy of the defect information list.

8. The method as claimed in claim 5, wherein:

the inner circumferential area of the optical disc medium includes a test write area used to set the write power to write data to the optical disc medium; and the method further comprises the step of:

if a pickup for reading the management information is on the inner circumferential side of the test write area when retrieval of the management information has been finished, moving the pickup to a location on the outer circumferential side of the test write area and causing the pickup to assume a wait state.

* * * * *